United States Patent
Shah et al.

(10) Patent No.: US 11,743,380 B2
(45) Date of Patent: Aug. 29, 2023

(54) SYSTEM AND METHOD FOR CONTEXT AWARE AUDIO ENHANCEMENT

(71) Applicant: Avaya Management L.P., Durham, NC (US)

(72) Inventors: Shamik Shah, Pune (IN); Valentine C. Matula, Granville, OH (US)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/201,238

(22) Filed: Mar. 15, 2021

(65) Prior Publication Data

US 2022/0294904 A1   Sep. 15, 2022

(51) Int. Cl.
| | |
|---|---|
| *H04M 3/51* | (2006.01) |
| *H04M 3/493* | (2006.01) |
| *G10L 21/013* | (2013.01) |
| *G06Q 30/0601* | (2023.01) |
| *G10L 25/30* | (2013.01) |
| *G06N 3/08* | (2023.01) |
| *G10L 21/0316* | (2013.01) |

(52) U.S. Cl.
CPC .......... *H04M 3/5166* (2013.01); *G06N 3/08* (2013.01); *G06Q 30/0601* (2013.01); *G10L 21/013* (2013.01); *G10L 21/0316* (2013.01); *G10L 25/30* (2013.01); *H04M 3/493* (2013.01)

(58) Field of Classification Search
None
See application file for complete search history.

(56) References Cited

U.S. PATENT DOCUMENTS

| | | | | |
|---|---|---|---|---|
| 5,425,130 A | * | 6/1995 | Morgan | G10L 21/00 704/270 |
| 6,125,175 A | * | 9/2000 | Goldberg | H04M 3/487 379/201.01 |
| 7,085,719 B1 | * | 8/2006 | Shambaugh | H04M 3/51 379/265.06 |

(Continued)

FOREIGN PATENT DOCUMENTS

| | | |
|---|---|---|
| JP | 2004-320573 | 11/2004 |
| JP | 2005-352151 | 12/2005 |

OTHER PUBLICATIONS

Official Action for India Patent Application No. 202214011550, dated Sep. 26, 2022 7 pages.

(Continued)

*Primary Examiner* — Nafiz E Hoque
(74) *Attorney, Agent, or Firm* — Sheridan Ross P.C.

(57) ABSTRACT

Contact centers strive to provide a positive and productive customer-agent interaction to successfully resolve the issue for a call. While audio content, such as music or messages, on hold are commonplace, selecting audio enhancements to be inserted into, and concurrently with, the customer-agent provides the customer and/or agent with cues and motivations to promote the successful completion of the call. Cues may be provided to announce the arrival or departure of an agent, virtually take a customer from one location to another for a different portion of the interaction, add excitement and anticipation to an upcoming event by providing an audio experience foreshadowing of the actual event, calm frayed nerves, or other purpose.

20 Claims, 7 Drawing Sheets

(56) References Cited

U.S. PATENT DOCUMENTS

| | | | |
|---|---|---|---|
| 8,229,078 B2* | 7/2012 | Wright | H04M 3/42 |
| | | | 379/88.16 |
| 8,386,265 B2* | 2/2013 | Subramanian | G10L 19/0018 |
| | | | 704/277 |
| 8,634,543 B2 | 1/2014 | Flockhart et al. | |
| 9,031,838 B1* | 5/2015 | Nash | H04M 3/2227 |
| | | | 704/226 |
| 9,172,805 B1* | 10/2015 | Jayapalan | H04M 3/5183 |
| 9,578,070 B2* | 2/2017 | Bain | H04L 65/1089 |
| 9,596,349 B1* | 3/2017 | Hernandez | G10L 17/08 |
| 9,648,161 B2* | 5/2017 | Jayapalan | H04M 3/5183 |
| 9,728,202 B2* | 8/2017 | Efrati | H04M 3/51 |
| 10,095,467 B2 | 10/2018 | Balassanian | |
| 10,382,609 B1* | 8/2019 | Antoine | H04M 1/72469 |
| 10,586,079 B2* | 3/2020 | Almudafar-Depeyrot | |
| | | | G10L 13/0335 |
| 10,922,738 B2 | 2/2021 | Swierk et al. | |
| 11,120,812 B1* | 9/2021 | Shi | G06N 20/00 |
| 11,133,010 B1* | 9/2021 | Waldmeier | G06F 40/284 |
| 2004/0125965 A1* | 7/2004 | Alberth, Jr. | H04M 1/72403 |
| | | | 381/61 |
| 2005/0119893 A1 | 6/2005 | Shambaugh et al. | |
| 2007/0041582 A1* | 2/2007 | Lam | H04M 1/72412 |
| | | | 379/908 |
| 2007/0223668 A1* | 9/2007 | Blumenfeld | H04L 65/1101 |
| | | | 379/201.01 |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2012/0263288 A1* | 10/2012 | Wright | H04M 3/42 |
| | | | 379/207.02 |

OTHER PUBLICATIONS

Official Action (with English translation) for Japan Patent Application No. 2022-036751, dated May 9, 2023 14 pages.

\* cited by examiner

| Record | Purpose | Content | Start Volume | Volume change | Duration |
|---|---|---|---|---|---|
| 1 | Soothe | Fountain004.mp3 | 2 | If stress_level, increasing, volume = +1 | indefinite |
| 2 | Task complete | Tada005.mp3 | 9 | 0.0 | 1.5 sec. |
| 3 | Upsell complete | Crowd_cheer006 | 8 | Decrement = 1/sec. | 4 sec. |
| 4 | Energize | uptempo122.mp3 | 1 | Increment = 0.1/sec; increment_max = 2; | indefinite |
| 5 | Stop strech | If content = "Fountain004.mp3" | current | Volume = off | <null> |
| 6 | De-escalate 1 | If content = "uptempo122.mp3" | current | Pace = pace/2; Volume = -2 | indefinite |
| 7 | De-escalate 2 | If content = "uptempo122.mp3" | current | Content=<record 1> | <null> |
| 8 | De-escalate 3 | <any> | current | Volume = off | <null> |

*Fig. 4*

SYSTEM AND METHOD FOR CONTEXT AWARE AUDIO ENHANCEMENT

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for mixed-mode communications and particularly to audio enhancements provided in a call.

BACKGROUND

A common objective of contact centers, such as a contact center that is a component of or supports an enterprise, is to utilize whatever tools are available to steer customer interactions to success, such as to sell a product or resolve a problem. In doing so, success is often measured in terms of customer satisfaction, survey scores, time required to complete the interaction, and resources (e.g., additional agents) utilized to bring the interaction to a conclusion. At the same time, the enterprise also wants to maximum the performance of the agents, while maintaining agent satisfaction, morale, and positive attitudes. Additionally, customer and agent experiences and expectations are shaped by what they see and hear. Personal experience, such as in-person shopping, in-person service (e.g., airport counters, jewelry stores, etc.), online videos, broadcast TV, radio & podcasts, TED talks, etc. contribute to the perception of what is, and is not, desired or expected during customer-agent interactions.

SUMMARY

Prior art solutions often utilize audio enhancements to promote a particular mood or to provide "an experience" during a self-service portion of an interaction, such a when the customer is on hold or navigating an interactive voice response (IVR) or other interaction with an automated system. One common audio enhancement is music on hold. The audio enhancement is often determined by a system-wide setting, attribute of a call, or workflow.

Audio and other enhancements are also utilized for agent coaching during a call. For example, call centers often present dynamic agent scripts, screen pops, and notes to agents that provide hints to the agents, which are based on the context of the interaction and/or the current conversation to promote improved customer service experience.

During customer-agent the only audio provided (at least intentionally) is the speech of the agent and the customer, or in certain circumstances, by agents and/or customers. Additional audio is provided to the customer, but not during the interaction with the agent. Audio provided to the agent is limited to agent-only audio (e.g., 'whisper' channel messages or customer service 'hints'). As a result, the conversation is plain and often boring. It is often desirable to change the mood of the customer, however, audio limited to the voice of the customer and agent, or silence, has a limited ability to change the "feel" of a conversation and as a result, improve the mood of the customer.

Additionally, a particular audio enhancement (e.g., sounds, music, volume, fade-in, fade-out, timing of introduction, timing of termination, etc.) may have, or not have, a desired impact. By utilizing an artificially intelligent agent, such as a neural network or other machine learning, audio enhancements may be selected and deployed to target particular customers, customer situations, specific agents, and the trajectory of the call as previously observed in prior calls and/or observed in the current call and applied to the current call.

These and other needs are addressed by the various embodiments and configurations of the present invention. The present invention can provide a number of advantages depending on the particular configuration. These and other advantages will be apparent from the disclosure of the invention(s) contained herein.

In one embodiment, selective application of audio enhancements to a customer-agent communication is applied to impact human psychology and influence mood and/or decision making. The audio enhancement(s) may be selected based on an artificial intelligence agent (AI) determined motivation and/or desired impact for a particular call, which may be based on one or more of a customer attribute, topic, purpose, past history, agent attributes, desired result, etc.

In another embodiment, the audio enhancements may comprise background music or other sounds (e.g., nature sounds, industrial sounds, traffic, background chatter, animals, etc.). The audio enhancement(s) may be applied to the customer portion alone, the agent portion alone, or to both the agent and customer portions. However, audio enhancement applied to the agent and to the customer may be the same or differ. The difference may include one or more of content, volume, point of introduction, point of termination, fade-in rate, fade-out rate, etc.

Selection of the audio may be based on an algorithmic or stored rule or AI determined factor(s) based on one or more of the context of the call; the customer's preferences or any explicit choices; the customer's interests which may be captured from resources such as social media, past history, etc.; the customer's mood which may be identified from language used, tone, pitch, regional or other demographic details.

In one example, background sounds of a theme park may be added to customer's portion of a call, and optionally the agent's portion, when buying park tickets. Similarly, a zoo may utilize animal sounds, crowd noise for sporting events, movie or filming music or noises movie tickets, and so on.

The background music or sounds selected, may be selected to provide a soothing experience to the customer and can also be used to have a desired psychological effect on the customer. For example, if the customer seems to be angry/frustrated, one can have a calm music running in background as the customer is having a heated argument with the agent. Accordingly, the background music can therefore be used not just to complement the conversation but also to drive the conversation. Fast tempo, rock, or similar music would be avoided during a heated conversation which, if used, may aggravate a tense situation.

In another example, if a customer is stretching out the conversation, despite the conversation getting to a dead-end, then fast music in the background can be added to trigger a hurry-up signal in the customer's brain, similar to "play off" music used in awards ceremonies to encourage an award recipient to wrap-up their acceptance speech.

Music may be added to overlay or mask background noise from the agent, or to fill-in silence, such as to provide 'comfort noise' during silence.

In another embodiments, inserting audio enhancements may be directed to the agent on a call, such as to provide relevant psychological indication or cues to the agents. For example, music may be inserted to trigger a "hurry up" signal in agent's brains. Similarly a calm music can help agents relax while conversating with an angry customer, and a motivational music would boost the agent's enthusiasm and/or to help agents retain their calm and energy levels for a prolong duration.

While identical audio enhancements may be provided to both the customer and the agent, in another embodiment, the customer and agent may be provided with different audio enhancements, such as background music, over the same call. Other differences may include the volume at which the background music is presented, timing and/or rate of fade-in/fade-out, changes to music/sounds, etc. In another embodiment, if a different agent joins the call or the call is about to be, or has been, transferred to a different agent, music/sounds may fade or rise as a means of introduction to the new agent on the call and/or the existing agent departing. In another embodiment, on-hold music may be faded-in, such as to start while the agent is still conversing with the customer and then reaching full volume when the call is actually put on hold or transferred.

The application of a particular audio enhancement is considered successful if the customer-agent interaction is favorably altered, such as may be determined by one or more of improved customer satisfaction, closing of a sale, resolution of an issue, more positive results of a customer survey, more positive results of an agent survey, more positive real time feedback from an agent on whether the audio enhancement was useful or beneficial, favorable post-call review by humans, and/or more positive post-call or real time review by automated systems (e.g., an AI).

In one embodiment, an AI may select an audio enhancement, such as music, entirely autonomously. The AI may select an audio enhancement based on a cue or limited input from the agent (e.g., quicken the pace/wrap-up the call, slow the pace, soothe the customer, etc.). Additionally or alternatively, the cue or limited input may be provided by the AI, such as to select a particular genre of music (e.g., country music, classical, etc.) or category (e.g., soothing, energetic, etc.) and allow the human agent to finalize the selection of the music that is within a genre or category. Similar to the selection of music or other sound, the AI may fully control, set high/low limits, or only suggest a volume, fade-in/fade-out, pace, or other level for the audio enhancement. The AI may monitor the audio level of the agent and/or customer and dynamically adjust the audio level to be at an appropriate level in absolute terms or relative to the audio level of the agent, customer, the combination thereof, and/or other notice (e.g., such as to mask environmental noise that may be inadvertently picked up by a microphone).

AI may analyze the discussion between agent and customer through speech-to-text conversion and subsequent context analysis, or by determining an attribute of the conversation, such as the energy level, pacing, turn-taking, etc. and use the results thereof to select and/or control the decision to introduce audio, the content to be selected, the volume level, etc.

As with rule-based audio control, AI-controlled Audio to the customer can take as input factors, which may include one or more of: the context of the call, provided via real time analysis or pre-communication (such as may be provided during an IVR session prior to being connected to a human agent) identifying the purpose for the call (e.g., help query, reservation booking, etc.); a customer's explicit or prior indication of preference/choice; a customer's interests as captured from various resources e.g. social media, past history, etc.; and/or mood of the customer as identified from the language, tone, pitch, voice, regional and other demographic details, facial expressions when the call further comprises video. The AI may provide the audio enhancement if requested by the human agent or automatically and without any request or other input from the agent.

Exemplary aspects are directed to:

A system, comprising: a network interface to a network; and a processor configured with machine-readable instructions maintained in a non-transitory storage that cause the processor to perform: monitoring a communication between an agent, utilizing an agent communication device, and a customer, utilizing a customer communication device, wherein the communication comprises encoded audio signals transmitted over the network; accessing a purpose of the communication; selecting an audio enhancement, from a plurality of audio enhancements, which corresponds to a purpose of the communication; and inserting the audio enhancement into the communication to comprise at portion of the encoded audio signals.

A system, comprising: a network interface to a network; and a processor configured with machine-readable instructions maintained in a non-transitory storage that cause the processor to perform: monitoring a communication between an agent, utilizing an agent communication device, and a customer, utilizing a customer communication device, wherein the communication comprises encoded audio signals transmitted over the network; accessing a purpose of the communication; providing the purpose of the communication to a neural network trained to select an audio enhancement, from a plurality of audio enhancements, which corresponds to a purpose of the communication; obtaining, from the neural network, the audio enhancement; and inserting the audio enhancement into the communication to comprise at portion of the encoded audio signals.

A method, comprising: monitoring a communication between an agent, utilizing an agent communication device, and a customer, utilizing a customer communication device, wherein the communication comprises encoded audio signals transmitted over a network; accessing a purpose of the communication; selecting an audio enhancement, from a plurality of audio enhancements, which corresponds to a purpose of the communication; and inserting the audio enhancement into the communication to comprise at portion of the encoded audio signals [0001]

Any of the above aspects:

wherein the encoded audio signals comprise the audio enhancement concurrently with speech from at least one of the agent or the customer.

wherein the audio enhancement further comprises an attribute of the audio enhancement comprising at least one of volume, tempo, pace, pitch, fade-in rate, fade-out rate, maximum volume, or minimum volume.

wherein the instructions further cause the processor to perform: accessing the purpose of the communication further comprising determining a current emotion of the customer, the current emotion being an apparent emotion presented by the customer during the communication; determining a desired emotion of the customer; and selecting the audio enhancement corresponding to an emotion mitigating attribute previously determined to result in a subject having the current emotion to transition to having the desired emotion.

wherein the instructions cause the processor to select the audio enhancement further comprising causing the processor to select the audio enhancement in accordance with a demographic attribute of the customer.

wherein the instructions further cause the processor to perform: accessing the purpose of the communication further comprising causing the customer to perform a task; and selecting the audio enhancement corresponding to an associated sound of the task.

wherein the audio enhancement is provided to one of the customer communication device or the agent communication device and not both.

wherein the instructions further cause the processor to perform: monitoring a second portion of the communication between the agent and the customer, the second portion of the communication occurring concurrently with insertion of the audio enhancement; updating the purpose of the communication in accordance with content of the communication provided by the customer; upon determining the content of the communication provided by the customer is in conflict with the audio enhancement, modifying the audio enhancement.

wherein the instructions cause the processor to modify the audio enhancement comprising one or more of terminating insertion of the audio enhancement, altering the content of the audio enhancement, altering the pace of the audio enhancement, altering the volume of the audio enhancement, or altering the pitch of the audio enhancement.

wherein the neural network is trained to select an audio enhancement, further comprising: accessing a set of past communications between a number of previous customers and a corresponding number of previous agents; applying one or more transformations to each past communication of the set of past communications including one or more of substituting a word with a synonymous word, substituting a word with a synonymous phrase, substituting a purpose of the communication for an object associated with the purpose, substituting the object associated with the purpose of the communication with a purpose, inserting at least one redundant word, or removing at least one redundant word to create a modified set of past communications; creating a first training set comprising the set of past communications, the modified set of past communications, and a set of different purposes previously determined to be unrelated to the purpose; training the neural network in a first state using the first training set; creating a second training set for a second state of training comprising the first training set and the set of different purposes previously determined to be unrelated to the purpose that are incorrectly identified as being related to the purpose; and training the neural network in the second state using the second training set.

wherein the audio enhancement further comprises an attribute of the audio enhancement comprising at least one of volume, tempo, pace, pitch, fade-in rate, fade-out rate, maximum volume, or minimum volume.

wherein the instructions further cause the processor to perform: accessing the purpose of the communication further comprising determining a current emotion of the customer, the current emotion being an apparent emotion presented by the customer during the communication; determining a desired emotion of the customer; and modifying the purpose to comprise transition the customer to have the desired emotion.

wherein the instructions cause the processor to select the audio enhancement further comprising causing the processor to select the audio enhancement in accordance with a demographic attribute of the customer.

wherein the instructions further cause the processor to perform: accessing the purpose of the communication further comprising causing the customer to perform a task; and selecting the audio enhancement corresponding to an associated sound of the task.

wherein the audio enhancement is provided to one of the customer communication device or the agent communication device and not both.

wherein the instructions further cause the processor to perform: monitoring a second portion of the communication between the agent and the customer, the second portion of the communication occurring concurrently with insertion of the audio enhancement; updating the purpose of the communication in accordance with content of the communication provided by the customer; upon determining the content of the communication provided by the customer is in conflict with the audio enhancement, modifying the audio enhancement.

wherein the instructions cause the processor to modify the audio enhancement comprising one or more of terminating insertion of the audio enhancement, altering the content of the audio enhancement, altering the pace of the audio enhancement, altering the volume of the audio enhancement, or altering the pitch of the audio enhancement.

wherein the audio enhancement further comprises an attribute of the audio enhancement comprising at least one of volume, tempo, pace, pitch, fade-in rate, fade-out rate, maximum volume, or minimum volume.

A system on a chip (SoC) including any one or more of the above aspects.

One or more means for performing any one or more of the above aspects.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above aspects, wherein the data storage comprises a non-transitory storage device comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures:

FIG. 4 depicts a second data structure in accordance with embodiments of the present disclosure;

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
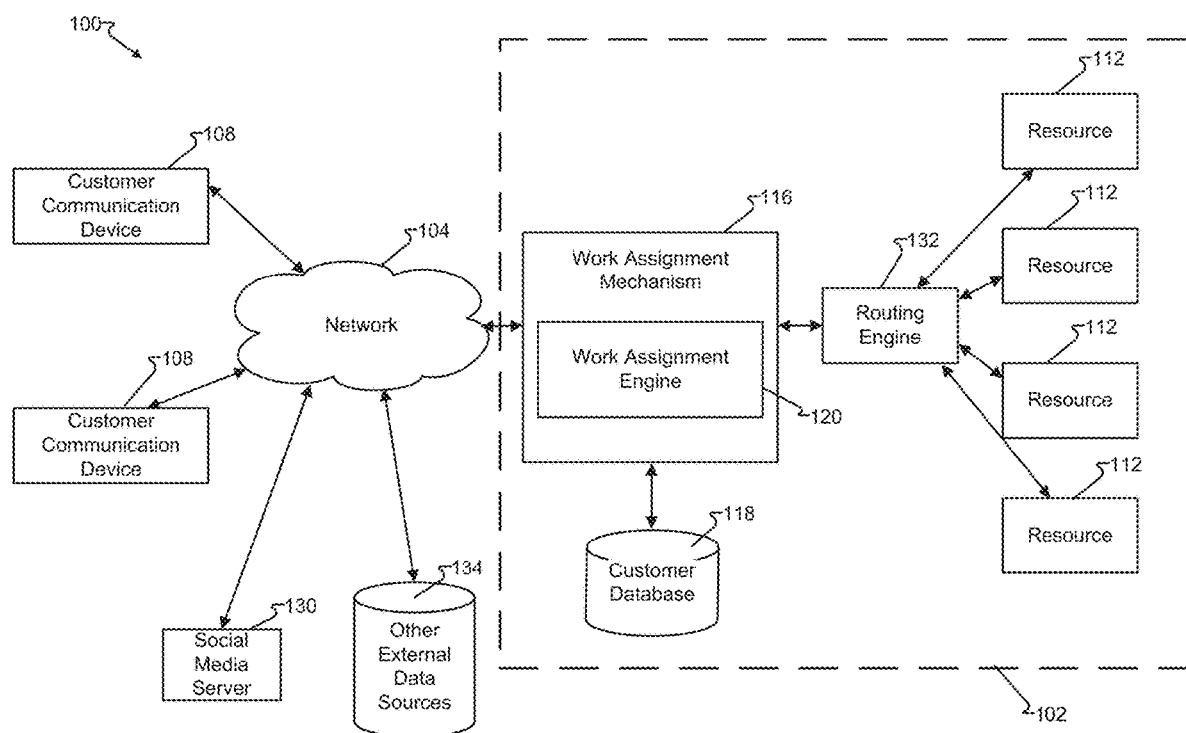
FIG. 1 depicts a first system in accordance with embodiments of the present disclosure.

FIG. 1 depicts communication system 100 in accordance with at least some embodiments of the present disclosure. The communication system 100 may be a distributed system and, in some embodiments, comprises a communication network 104 connecting one or more customer communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media server 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The customer communication devices 108 may correspond to customer communication devices. In accordance with at least some embodiments of the present disclosure, a customer may utilize their customer communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media server 130 or network of servers. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the customer communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the customer communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the customer communication devices 108 may comprise any type of known communication equipment or collection of communication equipment. Examples of a suitable customer communication device 108 include, but are not limited to, a personal computer, laptop, Personal Digital Assistant (PDA), cellular phone, smart phone, telephone, or combinations thereof. In general, each customer communication device 108 may be adapted to support video, audio, text, and/or data communications with other customer communication devices 108 as well as the processing resources 112. The type of medium used by the customer communication device 108 to communicate with other customer communication devices 108 or processing resources 112 may depend upon the communication applications available on the customer communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, microprocessors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more hardware components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage hardware components may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

Herein, a "call," is a real-time full duplex communication comprising audio and conducted between devices over a network, such as communication network 104. A call comprises audio captured and encoded by one device (or a peripheral thereto), transmitted over communication network 104, decoded and presented by another device (or a peripheral thereto). A call may optionally comprise video, which may be transmitted via a video channel, and/or other forms of communication (e.g., text chat). While calls may comprise various human-controlled and automated devices in various topologies, the embodiments herein are entirely directed to calls between a human, utilizing customer communication device 108 and one or more resource(s) 112 but only when embodied as a human agent utilizing an agent communication device. While the term "customer" may be utilized, such a term is provided as one embodiment and as a means to distinguish one human user from other humans, namely agents, and without limiting the role of such a human. Additionally, embodiments described herein may comprise an automated resource, such as to monitor a call's content (e.g., words spoken, inflection, tone, pace, emotion, etc.) vocalized by a customer and/or agent and for the insertion of audio enhancements. However, in addition to the customer, at least one human agent remains connected to the call via their respective communication devices. Calls between a customer, utilizing a customer communication device 108, and a resource 112 when solely embodied as an automated agent or other computerized resource are excluded from the embodiments herein. However, it should be appreciated that a call may comprise a customer connected with only an automated resource(s) during portions of a communication (e.g., enqueued for an agent, on hold, navigating a decision tree, IVR, post-interaction surveys, etc.), however such portions are excluded from "call" herein.

Figure 2:
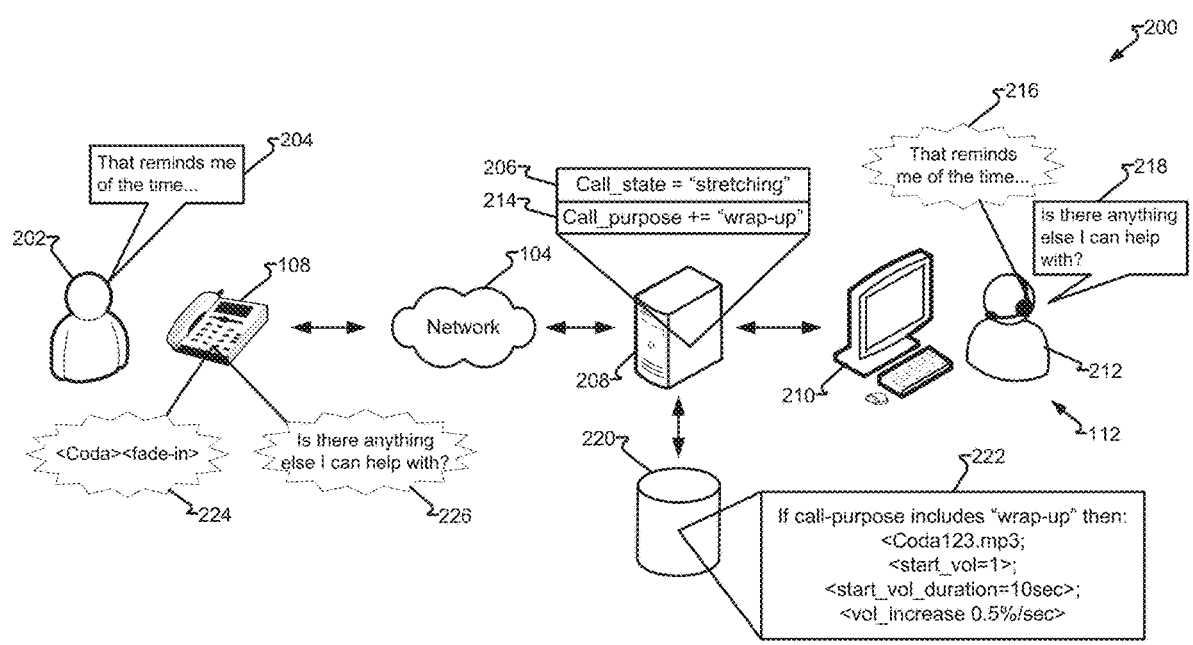
FIG. 2 depicts a second system in accordance with embodiments of the present disclosure.

FIG. 2 depicts system 200 in accordance with embodiments of the present disclosure. In one embodiment, customer 202 is engaged in a call with agent 212 utilizing customer communication device 108 and agent communication device 210, respectively, to communicate via communication network 104. Agent 212 and agent communication device 210 are an embodiment of resource 112 when embodied to comprise at least one human agent. For example, customer 202 may provide customer speech 204 which is presented to agent 212 as presented customer speech 216 and agent 212 may provide agent speech 218 which is presented to customer 202 as presented agent speech 226.

A call may have a number of purposes. One purpose may be the motivation for a call, such as customer 202 requesting technical support to resolve an issue, book a flight, check an account balance, etc. Additionally, at least one purpose for the call may be determined by contact center 102, such as by server 208. As a result, a purpose, or an additional purpose, may be to provide a better customer service experience, calm an angry customer, make a sale, upsell, wrap-up a call, etc. In one embodiment, server 208 monitors the content of the communication between customer 202 and agent 212. The content may include one or more of explicitly spoken words, speaking pace, tone, emotion, attitude, sounds, inflections, accent, and/or other vocalized content or change of any vocalized content provided by customer 202 and/or agent 212 during a call. For example, a call may have successfully concluded, that is, the purpose that motivated the call has been satisfied, however, customer 202 may be stretching the call, such as by talking about irrelevant topics, such as the content of customer speech 204. Server 208 may monitor the call and, among other things, determine call state 206 and, as a result, determine call purpose 214 to include an additional purpose, such as to wrap-up or end the call. Accordingly, data record 222 is accessed, which comprises audio enhancements (e.g., sound content and/or attributes of the sound content) for insertion into the call as presented audio enhancement 224.

As a benefit of the audio enhancement, cues are provided to promote an action or other behavior. Continuing the example above, customer 202 who may be "droning on" may hear a coda begin to fade-in and gradually increase in volume, much the same way an acceptance speech by an award recipient may be presented with a coda as signal that their allotted time has expired. The audio enhancements are variously embodied, and discussed more completely with respect to the embodiments that follow, and may include sounds to elicit excitement, calm, urgency, or other actions or reactions. Audio enhancements may be presented solely to customer communication device 108, solely to agent communication device 210, to both thereof. For example, server 208 may determine that agent 212 is speaking to quickly and/or that customer 202 is indicating they are being rushed, such as a word count of agent 212 being above a previously determined threshold or upon customer speech 204 comprising words such as, "hold on" or "I need a minute to think about that." Accordingly, server 208 may determine a purpose for the call is to slow down the pace of content provided by agent 212 and, as a result, select a record from data storage 220, which may result in an audio enhancement being presented solely to agent communication device 210 that is selected to slow the pace of speech by agent 212 without explicitly instructing agent 212 to slow down. Similarly, if server 208 determines that agent 212 is lethargic, a purpose of the call may be to energize agent 212 and, as a result, server 208 presents energetic music or other sounds to only agent communication device 210.

Another purpose may be to improve the customer experience or upsell. For example, customer 202 may be booking tickets to a theme park with agent 212. Server 208 may determine that an add-on to the trip, such as breakfast with park characters is available, would fit in the itinerary for customer 202, or otherwise may be desirable. Accordingly, a purpose may be added to the call to make customer 202 aware of the opportunity to have breakfast with the park's characters. As a result, customer communication device 108 may be provided with presented audio enhancement 224 comprising dishes clanking or characters acting out a restaurant scene. Agent 212 and/or audio enhancement 224 may then present additional information, such as to invite customer 202 to breakfast with the characters. Some or all of presented audio enhancement 224 may be presented solely to customer communication device 108, which may be indicated by a pop-up or other message on agent communication device 210 (e.g., "Customer is being presented with clanking dishes. Begin character breakfast offer in 3 . . . 2 . . . 1 . . . now."). As a result, customer 202 is presented with an audio experience selected to generate interest, anticipation, and excitement regarding the actual experience.

Contact centers often utilize a workflow to take a customer through a "journey" to resolve a particular purpose for a call. A complicated task, such as applying for a home loan may require a journey of several steps, such as gathering basic information, gathering verifiable information from banks or other resources, scheduling services (e.g., inspections, loan closings, etc.), underwriting, and/or other tasks. Often the different steps of a journey are handled by different agents. In contact centers of the prior art, this meant placing the customer on hold while they wait for the next agent in the journey to become available. In another embodiment, server 208 may determine that a purpose of a call now includes "taking" customer 202 from one step to another. As a result, presented audio enhancement 224 may comprise sounds of footsteps to simulate an actual journey. The footsteps may fade-in, as means to announce the arrival of another agent to the call, fade-out, as a means to announce the departure of a leaving agent, or constant, as a means to have the agent "walk with" customer 202 from one virtual place to another virtual place. Other sounds such as knocking, doors latching, doors being shut, etc., may be utilized alone, in parallel, or in series to one or more other audio enhancements for further satisfy the purpose.

As a benefit, customer 202 is provided with an "experience" from one or more audio enhancements that serve as a cue to a current or imminent transition and to generally improve the customer experience over simply placing customer 202 on hold to wait until the next agent joins.

Background noise(s) may be provided into a call to further improve the customer service experience and/or as a cue to the current step in a journey. For example, an audio enhancement may initially comprise snoring in character voices, during a step of a theme park reservation process selecting hotel accommodations, and then transition to clanking dishes and other restaurant sounds and banter when making restaurant reservations, and then to the sounds of the park when booking rides and passes. As a result, customer 202 and optionally agent 212 is provided with cues as to a current step in the reservation process without providing an explicit announcements (e.g., "next, we need to book your park passes.") that may interrupt the conversation between customer 202 and agent 212, but rather promotes a more natural conversation that, due the cue, is determined likely to transition to the next step in the journey.

In another embodiment, an audio enhancement is provided into the conversation that is determined to promote a particular mood or emotion. For example, the sounds of a crowd may be provided during a call booking tickets to a sporting event. Energetic music may transition to softer music upon determining that customer 202 is, or is becoming, angry, upset, or impatient. Similarly, audio enhancements may comprise music or non-music sounds (e.g., bubbling fountain, birds chirping, etc.) which may be added, alone or in parallel or series to other audio enhancements. Similarly, agent 212 may have had a particular difficult call and have some well-frayed nerves. Agent communication device 210 may then be provided with an audio enhancement selected to calm, motivate, or otherwise improve the mental state of agent 212.

The audio enhancements may comprise alterations thereto. For example, when booking tickets to a sporting event, an audio enhancement may comprise crowd noises and/or general sounds associated with the event. As the purchase nears completion, the audio enhancement altered, such as to make the crowd livelier and, upon the purchase being complete, and the crowd cheers similar to the team scoring a goal, with agent 212 needing to only perform the explicit task of gathering information and processing the purchase. However, if an audio enhancement is determined to not imparting the desired effect or having the opposite effect (e.g., customer 202 is becoming more angry or irritated), then the audio enhancement may be altered to slow the pace, decrease the volume, or terminate completely. Alterations to an audio enhancement may comprise one or more of a change in volume, tempo, pace, pitch, fade-in rate, fade-out rate, maximum volume, or minimum volume, as presented to customer communication device 108, agent communication device 210, or both customer communication device 108 and agent communication device 210 in accordance with at least one purpose of a call.

In yet another embodiment, the particular audio enhancement may be selected, at least in part on demographic information. For example, server 208 may determine that a purpose of a call is to soothe customer 202 and select an audio enhancement accordingly. The selection may further be based on age, geographic region, and/or other demographic attribute. As a benefit, an audio enhancement may be selected, or more specifically selected, based on appropriateness for a specific individual having the demographic attribute.

Figure 3:
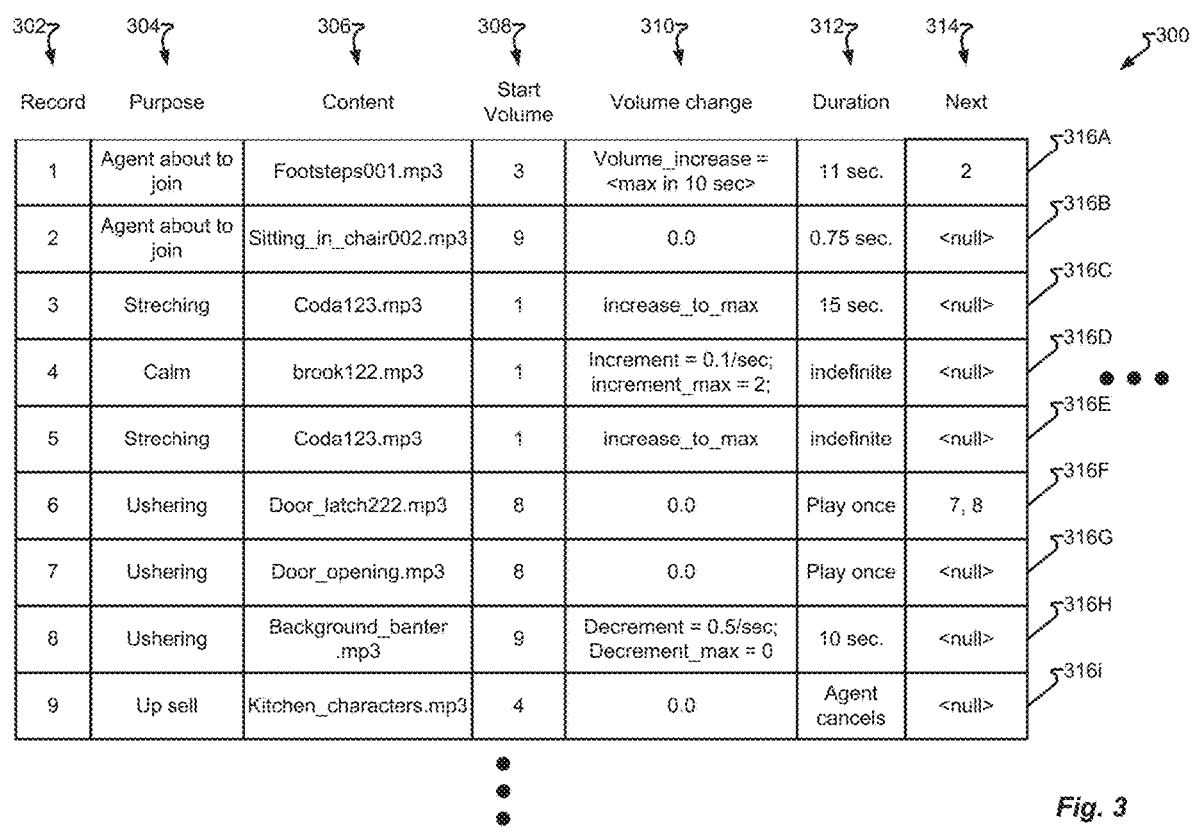
FIG. 3 depicts a first data structure in accordance with embodiments of the present disclosure.

FIG. 3 depicts data structure 300 in accordance with embodiments of the present disclosure. In one embodiment, a number of records 316 are provided within data structure 300 which may be maintained in data storage, such as data storage 220 accessible to a processor of server 208. Records 316 include examples illustrated by records 316A-i (lower case "i" being used herein to avoid confusion with the number one that may result had upper case letter "I" been used). Data structure 300 comprises a number of fields 302-314, illustrated as columns, and more specifically, record field 302, purpose field 304, content field 306, start volume field 308, volume change field 310, duration field 312, and next field 314. Additional, fewer, and/or alternate fields may be utilized without departing from the scope of the embodiments provided herein.

In one embodiment, record field 302 comprises a unique identifier of each record 316. Purpose field 304 maintains an associated purpose that, if found to be present in a call such as by server 208, may cause the corresponding record 316 to be selected to provide audio enhancement content, maintained, or identified in content field 306, to be presented to customer communication device 108 and/or agent communication device 210 by server 208. The presentation of a particular audio enhancement may comprise default attributes, such as a starting volume, maintained in start volume field 308 and the change in volume and/or rate of volume change, if any, applied during the insertion of the audio enhancement, as maintained by volume change field 310. It should be appreciated that other enhancements (e.g., tone, pace, etc.) may be applied in addition or alternatively to volume and volume changes. Additionally or alternatively, the content of one record 316 may be provided in series or parallel to content from another record. For example, a purpose of a call may be to introduce a new or next agent to the call and determined to match the value of purpose field 304 for record 316A to cause footsteps, selected from content field 306, to be inserted into the call. After an initial volume of three (such as on a scale of zero to ten), the volume is increased and played in total for eleven seconds, as indicated by start volume field 308, volume change field 310, and duration field 312, respectively. While some audio enhancements may be inserted (e.g., generated or looped) until the call ends, other audio enhancements have a definite end (e.g., the length of a song or track). At the end, or at the end of a duration value in duration field 314, the next record indicated by next field 314 is selected. Such as to insert the sounds of loudening footsteps that stop and are followed by sounds associated with sitting in a chair (e.g., squeaks, chair wheels rolling, etc.)

Audio enhancements may be inserted in series or parallel. For example, record 316F will play a door latch sound once and then insert the content maintained in content field 306 for record 316G (record "7") and record 316H (record "8"). Offsets may also be implemented, such as to allow a partial overlap so that two or more audio enhancements are provided simultaneously in one portion and serially in another portion. As a further option, a delay may be provided to allow one audio enhancements to be inserted and, upon terminating, a delay before the next audio enhancement is inserted.

FIG. 4 depicts data structure 400 in accordance with embodiments of the present disclosure. In one embodiment, data structure 400 is maintained in data storage 220 accessible to a processor of server 208. An audio enhancement may comprise an attribute or change in attribute for a particular sound based on a previously determined purpose or newly determined purpose. Data structure 400 comprises a number of fields 302-312, illustrated as columns, and more specifically, record field 402, purpose field 404, content field 406, start volume field 408, volume change field 410, and duration field 412. Additional, fewer, and/or alternate fields may be utilized without departing from the scope of the embodiments provided herein.

Data structure 400 may be accessed to alter default values for a current audio enhancement. For example, if a purpose of a call is determined by server 208 to soothe customer 202 and/or agent 212, then the content indicated in content field 406 may be played or, if already playing, altered such as to increment the volume if the stress level is increasing. Audio enhancements may be inserted in addition to any other audio enhancements, such as "ta da" indicated by record 416B, inserted individually, or gradually or abruptly terminated. For example, if a purpose of a call is determined by server 208 to "energize" or further energize one or both of customer 202 or agent 212, then record 416D may be selected which further increases the volume of the content indicated in content field 406. However, if the call turns negative (e.g., anger, irritation, etc.) then a purpose of the call may be to de-escalate the negative aspect of the call. As a result, record 416F may be selected which, as indicated by volume change field 410, both decreases the volume and halves the pace. Additionally or alternatively, record 416G may be selected to change the content, such as to play "record 1" (e.g., the content in content field 406 for record 416A). As a further addition or alternative, record 416H is selected which terminates the audio enhancement(s) entirely.

Figure 5:
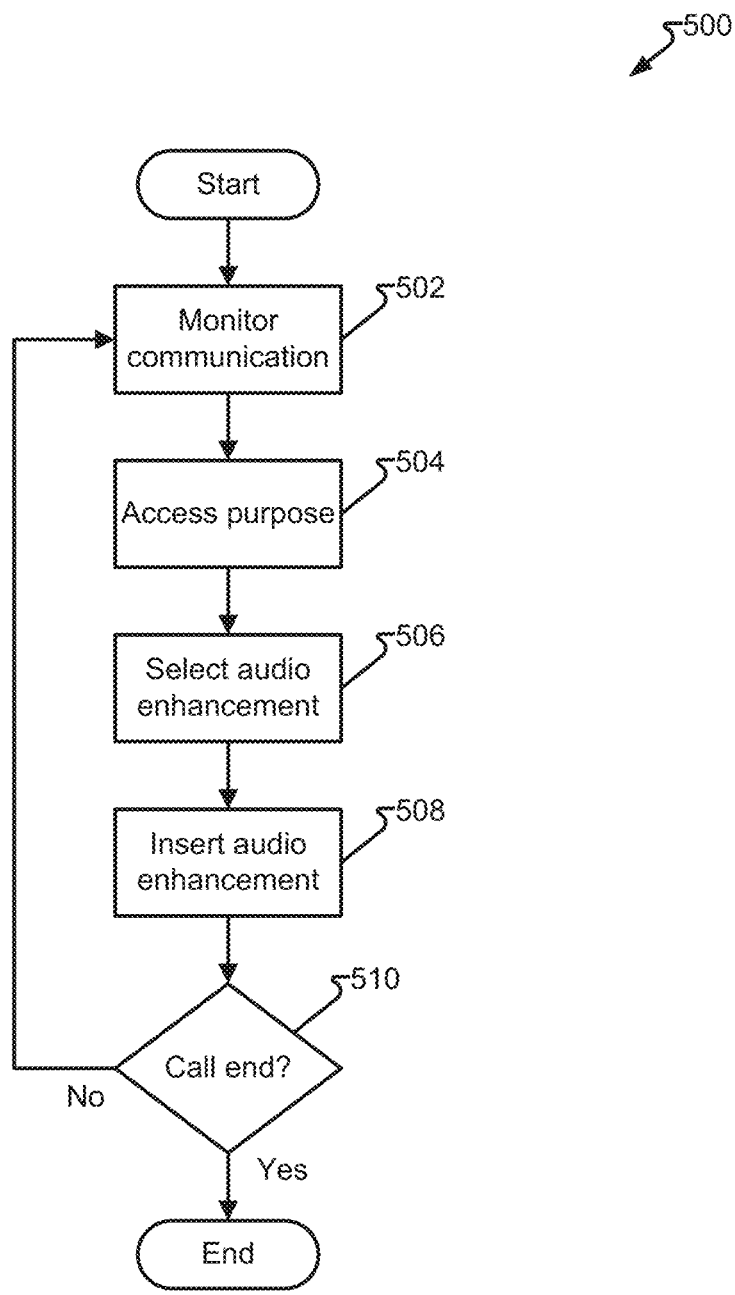
FIG. 5 depicts a first process in accordance with embodiments of the present disclosure.

FIG. 5 depicts process 500 in accordance with embodiments of the present disclosure. Process 500 may be embodied as machine-readable instructions that when read by a processor, such as a processor of server 208 and/or agent communication device 210, cause the processor to perform the steps of process 500. In one embodiment, process 500 begins and step 502 monitors a communication between a customer, such as customer 202 utilizing customer communication device 108 and agent 212 utilizing agent communication device 210. The communication may be newly initiated, such as to substantially occur concurrently with agent communication device 210 being connected to the call. In other embodiments, step 502 occurs after the call has been initiated and/or throughout the duration of the call.

Step 504 accesses a purpose of the call. The purpose may be determined prior to the call including agent 212 and/or determined in real-time based on monitored content of the call. Step 506 selects an audio enhancement for the call which is inserted into the call at step 508. Test 510 determines if the call has ended and, if determined in the negative, loops back to step 502, otherwise process 500 may terminate and/or be re-initiated for another call.

Figure 6:
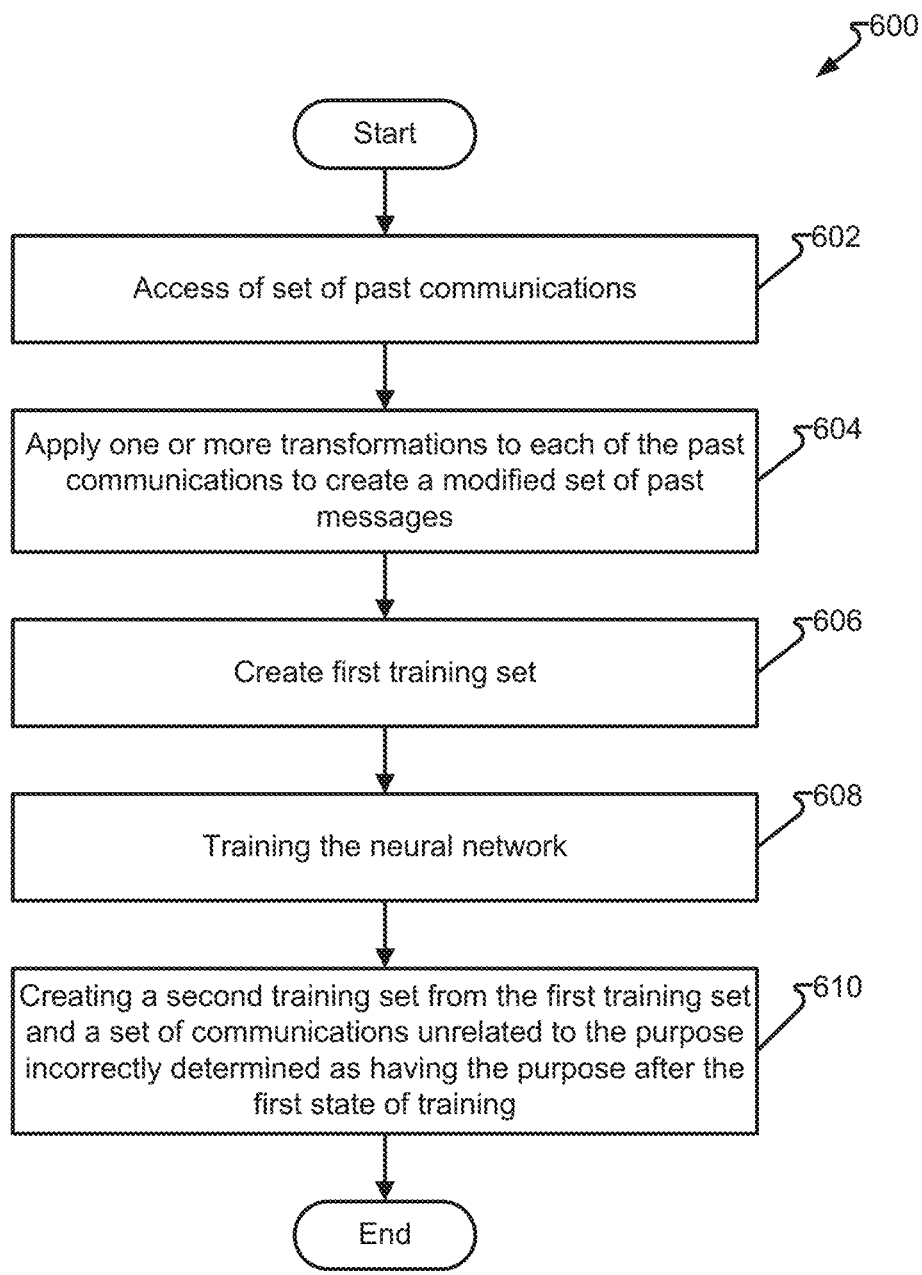
FIG. 6 depicts a second process in accordance with embodiments of the present disclosure.

FIG. 6 depicts process 600 in accordance with embodiments of the present disclosure. Process 600 may be embodied as machine-readable instructions that when read by a processor, such as a processor of server 208 and/or agent communication device 210, cause the processor to perform the steps of process 600. In one embodiment, the determination of whether a call has a purpose is accessed as the output from a neural network trained to make such determinations.

A neural network, as is known in the art and in one embodiment, self-configures layers of logical nodes having an input and an output. If an output is below a self-determined threshold level, the output is omitted (i.e., the inputs are within the inactive response portion of a scale and provide no output), if the self-determined threshold level is above the threshold, an output is provided (i.e., the inputs are within the active response portion of a scale and provide an output), the particular placement of the active and inactive delineation is provided as a training step or steps. Multiple inputs into a node produce a multi-dimensional plane (e.g., hyperplane) to delineate a combination of inputs that are active or inactive.

In one embodiment, process 600 begins and step 602 accesses a set of past communications. Step 604 applies one or more transformations to each communication in the set of past communications. The transformations may comprise one or more of substituting a word with a synonymous word, substituting a word with a synonymous phrase, substituting a purpose of the communication for an object associated with the purpose, substituting the object associated with the purpose of the communication with a purpose, inserting at least one redundant word, removing at least one redundant word, inserting an absent emotion, removing a present emotion, altering an intensity of a present emotion, inserting a vocalization, removing a vocalization, and/or altering an intensity of a vocalization.

Next, step 606 creates the first training set from the set of past communications, the modified set of past communications, and a set of different purposes previously determined to be unrelated to the purpose. Step 608 then trains the neural network with the first training set. In step 610, a second training set is created from the first training set and the set of purposes previously determined to be unrelated to the purpose and incorrectly identified as being related to the purpose.

Figure 7:
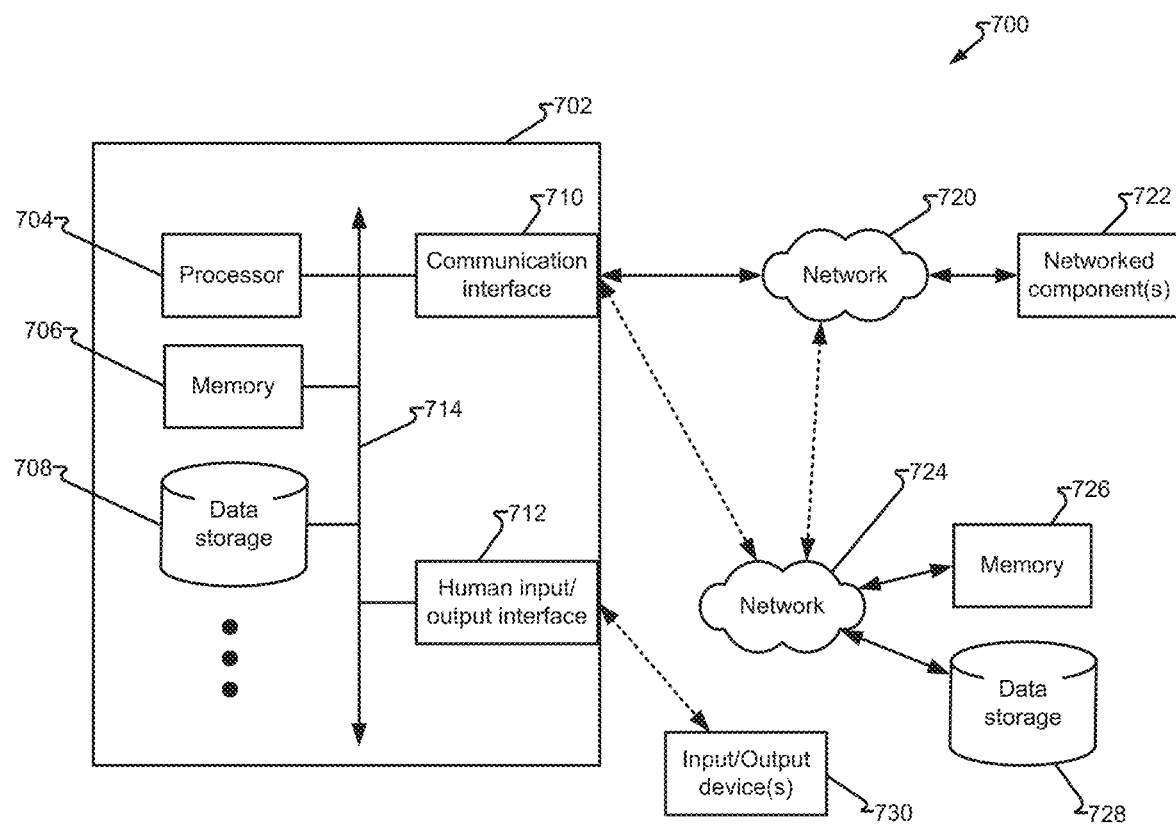
FIG. 7 depicts a third system in accordance with embodiments of the present disclosure.

FIG. 7 depicts device 702 in system 700 in accordance with embodiments of the present disclosure. In one embodiment, server 208 and/or agent communication device 210 may be embodied, in whole or in part, as device 702 comprising various components and connections to other components and/or systems. The components are variously embodied and may comprise processor 704. The term "processor," as used herein, refers exclusively to electronic hardware components comprising electrical circuitry with connections (e.g., pin-outs) to convey encoded electrical signals to and from the electrical circuitry. Processor 704 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 714, executes instructions, and outputs data, again such as via bus 714. In other embodiments, processor 704 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 704 is a non-transitory computing device (e.g., electronic machine comprising circuitry and connections to communicate with other components and devices). Processor 704 may operate a virtual processor, such as to process machine instructions not native to the processor (e.g., translate the VAX operating system and VAX machine instruction code set into Intel® 9xx chipset code to allow VAX-specific applications to execute on a virtual VAX processor), however, as those of ordinary skill understand, such virtual processors are applications executed by hardware, more specifically, the underlying electrical circuitry and other hardware of the processor (e.g., processor 704). Processor 704 may be executed by virtual processors, such as when applications (i.e., Pod) are orchestrated by Kubernetes.

Virtual processors allow an application to be presented with what appears to be a static and/or dedicated processor executing the instructions of the application, while underlying non-virtual processor(s) are executing the instructions and may be dynamic and/or split among a number of processors.

In addition to the components of processor 704, device 702 may utilize memory 706 and/or data storage 708 for the storage of accessible data, such as instructions, values, etc. Communication interface 710 facilitates communication with components, such as processor 704 via bus 714 with components not accessible via bus 714. Communication interface 710 may be embodied as a network port, card, cable, or other configured hardware device. Additionally or alternatively, human input/output interface 712 connects to one or more interface components to receive and/or present information (e.g., instructions, data, values, etc.) to and/or from a human and/or electronic device. Examples of input/output devices 730 that may be connected to input/output interface include, but are not limited to, keyboard, mouse, trackball, printers, displays, sensor, switch, relay, speaker, microphone, still and/or video camera, etc. In another embodiment, communication interface 710 may comprise, or be comprised by, human input/output interface 712. Communication interface 710 may be configured to communicate directly with a networked component or utilize one or more networks, such as network 720 and/or network 724.

Communication network 104 may be embodied, in whole or in part, as network 720. Network 720 may be a wired network (e.g., Ethernet), wireless (e.g., WiFi, Bluetooth, cellular, etc.) network, or combination thereof and enable device 702 to communicate with networked component(s) 722. In other embodiments, network 720 may be embodied, in whole or in part, as a telephony network (e.g., public switched telephone network (PSTN), private branch exchange (PBX), cellular telephony network, etc.)

Additionally or alternatively, one or more other networks may be utilized. For example, network 724 may represent a second network, which may facilitate communication with components utilized by device 702. For example, network 724 may be an internal network to a business entity or other organization, such as contact center 102, whereby components are trusted (or at least more so) that networked components 722, which may be connected to network 720 comprising a public network (e.g., Internet) that may not be as trusted.

Components attached to network 724 may include memory 726, data storage 728, input/output device(s) 730, and/or other components that may be accessible to processor 704. For example, memory 726 and/or data storage 728 may supplement or supplant memory 706 and/or data storage 708 entirely or for a particular task or purpose. For example, memory 726 and/or data storage 728 may be an external data repository (e.g., server farm, array, "cloud," etc.) and allow device 702, and/or other devices, to access data thereon. Similarly, input/output device(s) 730 may be accessed by processor 704 via human input/output interface 712 and/or via communication interface 710 either directly, via network 724, via network 720 alone (not shown), or via networks 724 and 720. Each of memory 706, data storage 708, memory 726, data storage 728 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 730 may be a router, switch, port, or other communication component such that a particular output of processor 704 enables (or disables) input/output device 730, which may be associated with network 720 and/or network 724, to allow (or disallow) communications between two or more nodes on network 720 and/or network 724. For example, a connection between one particular customer, using a particular customer communication device 108, may be enabled (or disabled) with a particular networked component 722 and/or particular resource 112. Similarly, one particular networked component 722 and/or resource 112 may be enabled (or disabled) from communicating with a particular other networked component 722 and/or resource 112, including, in certain embodiments, device 702 or vice versa. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
   a network interface to a network; and
   a processor configured with machine-readable instructions maintained in a non-transitory storage that cause the processor to perform:
   monitoring a communication between an agent, utilizing an agent communication device, and a customer, utilizing a customer communication device, wherein the communication comprises encoded audio signals transmitted over the network;
   accessing a purpose of the communication;
   selecting an audio enhancement comprising an audio, from a plurality of audio enhancements, which corresponds to a purpose of the communication; and overlapping the audio enhancement with speech from the agent in the communication to comprise a portion of the encoded audio signals and wherein the speech from the agent is presented to the customer communication device.

2. The system of claim 1, wherein the encoded audio signals comprise the audio enhancement concurrently with speech from the customer.

3. The system of claim 1, wherein the audio enhancement further comprises an attribute of the audio enhancement comprising at least one of volume, tempo, pace, pitch, fade-in rate, fade-out rate, maximum volume, or minimum volume.

4. The system of claim 1, wherein the instructions further cause the processor to perform:
accessing the purpose of the communication further comprising determining a current emotion of the customer, the current emotion being an apparent emotion presented by the customer during the communication;
determining a desired emotion for the customer; and
selecting the audio enhancement corresponding to an emotion mitigating attribute previously determined to result in a subject having the current emotion to transition to having the desired emotion.

5. The system of claim 1, wherein the instructions cause the processor to select the audio enhancement further comprising causing the processor to select the audio enhancement in accordance with a demographic attribute of the customer.

6. The system of claim 1, wherein the instructions further cause the processor to perform:
accessing the purpose of the communication further comprising causing the customer to perform a task; and
selecting the audio enhancement corresponding to an associated sound of the task.

7. The system of claim 1, wherein the audio enhancement is provided to one of the customer communication device or the agent communication device and not both.

8. The system of claim 1, wherein the instructions further cause the processor to perform:
monitoring a second portion of the communication between the agent and the customer, the second portion of the communication occurring concurrently with overlapping of the audio enhancement;
updating the purpose of the communication in accordance with content of the communication provided by the customer; and
upon determining the content of the communication provided by the customer is in conflict with the audio enhancement, modifying the audio enhancement.

9. The system of claim 8, wherein the instructions cause the processor to modify the audio enhancement comprising one or more of terminating overlapping of the audio enhancement, altering the content of the audio enhancement, altering a pace of the audio enhancement, altering a volume of the audio enhancement, or altering a pitch of the audio enhancement.

10. A system, comprising:
a network interface to a network; and
a processor configured with machine-readable instructions maintained in a non-transitory storage that cause the processor to perform:
monitoring a communication between an agent, utilizing an agent communication device, and a customer, utilizing a customer communication device, wherein the communication comprises encoded audio signals transmitted over the network;
accessing a purpose of the communication;
providing the purpose of the communication to a neural network trained to select an audio enhancement comprising an audio, from a plurality of audio enhancements, which corresponds to a purpose of the communication;
obtaining, from the neural network, the audio enhancement; and
overlapping the audio enhancement with speech from the agent into the communication to comprise a portion of the encoded audio signals and wherein the speech from the agent is presented to the customer communication device.

11. The system of claim 10, wherein the neural network is trained to select the audio enhancement, further comprising:
accessing a set of past communications between a number of previous customers and a corresponding number of previous agents;
applying one or more transformations to each past communication of the set of past communications including one or more of substituting a word with a synonymous word, substituting a word with a synonymous phrase, substituting a purpose of the communication for an object associated with the purpose, substituting the object associated with the purpose of the communication with a purpose, inserting at least one redundant word, or removing at least one redundant word to create a modified set of past communications;
creating a first training set comprising the set of past communications, the modified set of past communications, and a set of different purposes previously determined to be unrelated to the purpose;
training the neural network in a first state using the first training set;
creating a second training set for a second state of training comprising the first training set and the set of different purposes previously determined to be unrelated to the purpose that are incorrectly identified as being related to the purpose; and
training the neural network in the second state of training using the second training set.

12. The system of claim 11, wherein the audio enhancement further comprises an attribute of the audio enhancement comprising at least one of volume, tempo, pace, pitch, fade-in rate, fade-out rate, maximum volume, or minimum volume.

13. The system of claim 11, wherein the instructions further cause the processor to perform:
accessing the purpose of the communication further comprising determining a current emotion of the customer, the current emotion being an apparent emotion presented by the customer during the communication;
determining a desired emotion of the customer; and
modifying the purpose to comprise transitioning the customer to have the desired emotion.

14. The system of claim 11, wherein the instructions cause the processor to select the audio enhancement further comprising causing the processor to select the audio enhancement in accordance with a demographic attribute of the customer.

15. The system of claim 11, wherein the instructions further cause the processor to perform:
accessing the purpose of the communication further comprising causing the customer to perform a task; and
selecting the audio enhancement corresponding to an associated sound of the task.

16. The system of claim 11, wherein the audio enhancement is provided to one of the customer communication device or the agent communication device and not both.

17. The system of claim 11, wherein the instructions further cause the processor to perform:
monitoring a second portion of the communication between the agent and the customer, the second portion of the communication occurring concurrently with overlapping of the audio enhancement;
updating the purpose of the communication in accordance with content of the communication provided by the customer; and
upon determining the content of the communication provided by the customer is in conflict with the audio enhancement, modifying the audio enhancement.

18. The system of claim 17, wherein the instructions cause the processor to modify the audio enhancement comprising one or more of terminating overlapping of the audio enhancement, altering the content of the audio enhancement, altering a pace of the audio enhancement, altering a volume of the audio enhancement, or altering a pitch of the audio enhancement.

19. A method, comprising:
monitoring a communication between an agent, utilizing an agent communication device, and a customer, utilizing a customer communication device, wherein the communication comprises encoded audio signals transmitted over a network;
accessing a purpose of the communication;
selecting an audio enhancement comprising an audio, from a plurality of audio enhancements, which corresponds to a purpose of the communication; and
overlapping the audio enhancement with speech from the agent into the communication to comprise a portion of the encoded audio signals and wherein the speech from the agent is presented to the customer communication device.

20. The method of claim 19, wherein the audio enhancement further comprises an attribute of the audio enhancement comprising at least one of volume, tempo, pace, pitch, fade-in rate, fade-out rate, maximum volume, or minimum volume.

* * * * *